L. KORZAGADARIAN.
HOIST.
APPLICATION FILED DEC. 28, 1917.

1,326,670.

Patented Dec. 30, 1919.

Inventor,
Leon Korzagadarian,
By
Attorney

UNITED STATES PATENT OFFICE.

LEON KORZAGADARIAN, OF NEWPORT, RHODE ISLAND.

HOIST.

1,326,670.  Specification of Letters Patent.  Patented Dec. 30, 1919.

Application filed December 28, 1917. Serial No. 209,321.

*To all whom it may concern:*

Be it known that I, LEON KORZAGADARIAN, an Armenian, subject of the Sultan of Turkey, and resident of Newport, in the county of Newport, and State of Rhode Island, U. S. A., have invented certain new and useful Improvements in Hoists, of which the following is a specification.

This invention relates to hoisting devices and particularly to means for raising stoves and furniture while carpet or floor coverings are being laid, the said invention having novel means for preventing tilting of the said furniture regardless of the position of the said furniture with relation to the hoisting device.

A further object of the invention is to produce a hoisting device which is adjustable so that it can be used in connection with different objects while at the same time maintaining its efficiency.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
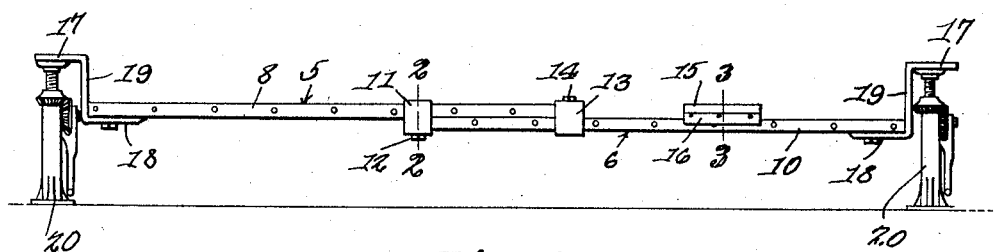
Figure 2:
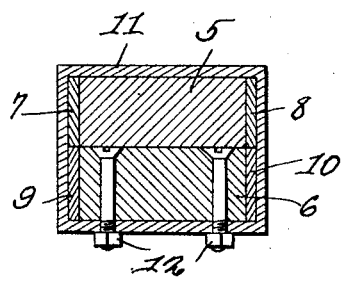
Figure 3:
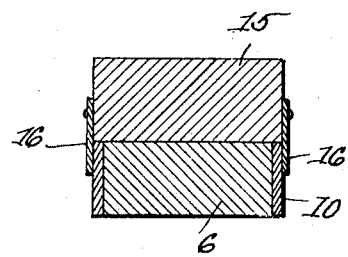

Figure 1 illustrates a view in elevation of the device in condition for use;
Fig. 2 illustrates a section on the line 2—2 of Fig. 1; and Fig. 3 illustrates a section on the line 3—3 of Fig. 1.

In these drawings, I have shown the furniture engaging device as comprising two telescopically connected members 5 and 6 relatively wide, so as to present a fair bearing surface upon which the furniture may be supported, and each member has plates on its edges preferably of metal, the plates on the member 5 being identified by the numerals 7 and 8 and the plates on the member 6 being identified by the numerals 9 and 10. They serve as strengthening or wear resisting devices and are preferably of metal, as stated. The member 6 has a guide 11 secured to it at or near its end by bolts 12 and the member 5 has a guide 13 secured to it near its end by bolts such as 14. The member 5 is slidable in the guide 11 and the member 6 is slidable in the guide 13 and as the members telescope the guides retain the members in their assembled relation to each other.

As the member 6 is lower than the member 5, it is desirable to have a support on the member 6, the upper surface of which will aline with the upper surface of the member 5 so that when furniture is supported on the members, it will be prevented from tilting as it might do if no provision were made for supporting it and to avoid such tilting action and to hold the furniture level, a block 15 is applied to the member 6 and it is preferably of a width equal to the width of the said members and the thickness of the edge plates shown in Fig. 3. The member 15 has side flanges 16 which embrace the edges of the member 6 and it may be slid on the said member so that it may be brought to proper position to engage the article of furniture being supported.

Each of the members has a bracket 17 at its outer end and each of the brackets has a means for fastening it to its appropriate member as shown at 18. The outer end of each bracket when in operative position lies horizontally and at an angle to an upwardly extending portion 19 of the said bracket. The horizontally extended portion of each bracket is engaged by a jack 20 by which the brackets may be elevated or lowered according to the requirements in practice. I have not illustrated the details of the jack as any suitable jack may be employed in connection with the furniture engaging members but preferably a hand jack is employed at each end so that when the furniture engaging member is placed under an article of furniture, the jacks may be inserted under the brackets and operated to gradually lift the furniture so that floor coverings or the like may be placed under it and by the use of hand jacks, there will be no jarring action during the elevation of the furniture or during its restoration to its normal position.

Owing to the telescopic arrangement of the members, the device can be used under widely varying conditions and in connection with furniture of widely varying characters.

When the members are extended or pulled out, the supporting blocks 15 would be movable to a position to engage or support the furniture at one side, thus holding it on a level with that portion which is engaged by the lowermost telescoping member.

I claim:

In a furniture hoisting device, superimposed telescopically connected members, the uppermost of which constitutes a support for the article to be carried, a guide on the inner end of each member embracing the other member for holding the said members in assembled relation, brackets on the outer end of each member, hoisting devices engaging the said brackets, and a leveling block movably mounted on the lowermost telescopic member and coextensive in thickness with the thickness of the uppermost member and coacting with the uppermost member as a support for an article to be carried.

LEON KORZAGADARIAN.